United States Patent
Yuzurihara et al.

(10) Patent No.: US 7,362,683 B2
(45) Date of Patent: Apr. 22, 2008

(54) OPTICAL RECORDING METHOD

(75) Inventors: Hajime Yuzurihara, Kanagawa (JP); Mikiko Abe, Kanagawa (JP); Hiroshi Deguchi, Kanagawa (JP); Eiko Hibino, Kanagawa (JP); Hiroshi Miura, Kanagawa (JP); Kazunori Ito, Kanagawa (JP); Michiharu Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 634 days.

(21) Appl. No.: 10/730,922

(22) Filed: Dec. 10, 2003

(65) Prior Publication Data

US 2004/0141447 A1    Jul. 22, 2004

(30) Foreign Application Priority Data

Dec. 18, 2002   (JP)   ............... 2002-367002

(51) Int. Cl.
    *G11B 7/00*   (2006.01)
(52) U.S. Cl. ................. 369/59.11; 369/59.12
(58) Field of Classification Search ............ 369/59.11, 369/59.12, 59.1, 116
    See application file for complete search history.

(56) References Cited

U.S. PATENT DOCUMENTS

| | | | |
|---|---|---|---|
| 6,018,510 A | 1/2000 | Abe et al. | |
| 6,096,398 A | 8/2000 | Yuzurihara et al. | |
| 6,177,167 B1 | 1/2001 | Yuzurihara et al. | |
| 6,391,417 B1 | 5/2002 | Yuzurihara et al. | |
| 6,411,579 B2 | 6/2002 | Natsuko | |
| 6,426,936 B1 | 7/2002 | Shinotsuka et al. | |
| 6,479,121 B1 | 11/2002 | Miura et al. | |
| 6,548,137 B2 | 4/2003 | Ito et al. | |
| 2001/0041240 A1 | 11/2001 | Ito et al. | |
| 2002/0021643 A1 | 2/2002 | Miura et al. | |
| 2002/0098445 A1 | 7/2002 | Harigaya et al. | |
| 2002/0110063 A1 | 8/2002 | Yamada et al. | |
| 2002/0145963 A1 | 10/2002 | Narumi et al. | |
| 2002/0155248 A1 | 10/2002 | Ito et al. | |

(Continued)

FOREIGN PATENT DOCUMENTS

| | | |
|---|---|---|
| EP | 0 978 827 A2 | 2/2000 |
| EP | 1 246 173 A2 | 10/2002 |
| EP | 1 260 973 A2 | 11/2002 |
| JP | 2941703 | 6/1999 |
| JP | 2000-149262 | 5/2000 |
| JP | 2001-60319 | 3/2001 |
| JP | 2002-260226 | 9/2003 |

*Primary Examiner*—Nabil Hindi
(74) *Attorney, Agent, or Firm*—Dickstein Shapiro LLP (57) ABSTRACT

An optical recording method of recording information to a phase change optical recording medium with alternate application of peak power and bias power in a pulse manner and with changing a pulse application interval continuously from an inner part through an outer part of the recording medium with an interval proportional to a window width Tw and a fixed interval, comprising the step of starting a top peak power application interval with a delay from a data input pulse signal starting time for a target mark length nTw, where n denotes an integer in a range between 3 and 14, with changing the delay in proportion to the window width Tw with changing a proportionality factor discretely with respect each linear velocity.

18 Claims, 7 Drawing Sheets

U.S. PATENT DOCUMENTS

| | | |
|---|---|---|
| 2002/0160306 A1 | 10/2002 | Hanaoka et al. |
| 2002/0163876 A1 | 11/2002 | Shinotsuka et al. |
| 2002/0196324 A1 | 12/2002 | Abe et al. |
| 2003/0003395 A1 | 1/2003 | Yuzurihara et al. |
| 2003/0012917 A1 | 1/2003 | Harigaya et al. |
| 2003/0124298 A1 | 7/2003 | Ito et al. |
| 2003/0143365 A1 | 7/2003 | Ito et al. |
| 2003/0152006 A1 | 8/2003 | Ohkura et al. |
| 2003/0180495 A1 | 9/2003 | Ito et al. |
| 2004/0037203 A1 | 2/2004 | Harigaya et al. |

OPTICAL RECORDING METHOD

BACKGROUND OF THE INVENTION

1. Field of the Invention

The present invention relates to a recording method for a phase change optical recording medium, and, in particular, to a recording method for a rewritable DVD medium.

2. Description of the Related Art

Recently, a large size of image data is handled, and, therefore, a recording medium therefor thus having a larger storage capacity is demanded. Further, it is also demanded to record such a large size of image data in the recording medium and reproduce the same therefrom at high speed. A technique of phase change optical recording medium is applied to a CD or DVD rewritable recording medium, and has been wide used since it has characteristics of having a large storage capacity and has a high compatibility with a ROM. Especially., high speed recording/playback has been achieved with CD-ROM or CD-R, and, as a result, a phase change optical recording medium is also demanded to have a performance such that high speed recording/playback can be achieved therewith. Furthermore, it is preferable that a disk which has a performance of high speed recording/playback should also have a capability of recording thereto also with a low-speed disk drive which is originally designed for a disk for a low recording linear velocity. In fact, a CD-R in the market has such a performance, thus covering a wide range of recording linear velocity.

On the other hand, in order to achieve high speed recording, a high-power laser which can provide a higher peak power is needed. However, in general, an optical output of a laser mounted in a low-speed disk drive is lower than the output of a high-speed disk drive. Therefore, it is difficult to achieve recording on a disk designed for a high linear velocity with a low linear velocity and with a lower power in case a phase change optical recording medium is applied.

In case of applying a phase change optical recording medium, a medium configuration is optimized so that recording at a high linear velocity is achieved. However, as a result, an optimum peak power increases even in a case of recording at a low linear velocity same as in a case of recording at a high linear velocity. In order to achieve recording at a lower linear velocity on a recording medium which is designed for recording at a high linear velocity, it is necessary to improve sensitivity. For this purpose, there is a method in which the reflectance of a recording medium is decreased. However, in a case of DVD, in order to provide a compatibility with a DVD-ROM, it is not possible to lower the reflectance more than necessary. In a case of a rewritable DVD, the maximum linear velocity is 2.4 time speed (2.4×) in the market within recent several years, and, there is no backward compatible phase change optical recording medium such that recording can be achieved thereon at a linear velocity higher than the above-mentioned maximum linear velocity, and also, recording can be achieved thereon also with a conventional disk drive designed merely for low linear velocity recording.

In order to satisfy this requirement, it is necessary to find out a recording material and a medium configuration for a phase change optical recording medium on which recording can be achieved with a low power and also having a wide margin of peak power, and to create an optimum recording method therefor. As such a recording method, Japanese Patent No. 2941703 discloses a method for forming a record mark in which a tail pulse bias power application ending time is determined without regard to a recording linear velocity. However, in this method, it may be difficult to obtain satisfactory recording characteristics for a wide range of recording linear velocity.

Japanese laid-open patent application No. 2001-060319 discloses a method in which a peak pulse power application interval and a subsequent multi-pulse peak power application interval are changed according to a recording linear velocity, a bias power application interval is provided at the pulse tail, these intervals are optimized, and, thus, satisfactory recording characteristics can be obtained. However, this method does not include a method applicable for a CAV manner.

Further, Japanese laid-open patent application No. 2001-118245 discloses a method based on the above-mentioned method which is applicable to a CAV (constant angular velocity) manner in which a recording linear velocity changes continuously from a low linear velocity through a high linear velocity as a recording radial position on the disk optical recording medium changes from an inner circumferential part through an outer circumferential part. In this method, a top peak power application starting time is fixed, the peak power application interval is changed, and further a subsequent multi-pulse peak power application interval is changed for each linear velocity in CAV recording. However, in this method, since a recording manner in which both the top pulse starting time and the power application interval are changed is not applied, it may not be possible to precisely control a starting position of a top of a mark actually recorded.

Other than the above, the applicant of the present application proposed by Japanese patent application No. 2002-261281, a method applicable to CAV recording on a recording medium which is compatible in recording/playback with a disk drive with a maximum linear velocity of 2.4 time speed (2.4×).

However, in this method, control of a top peak power application starting time may not be sufficient and thus there may occur a case where a satisfactory performance is not obtained for a certain item in recording characteristics.

SUMMARY OF THE INVENTION

When a medium configuration and a recording material of a phase change optical recording medium are optimized for providing a medium suitable for high linear velocity recording, it is difficult to obtain a satisfactory performance throughout a wide range of linear velocity only by means of pulse interval control of light pulse applied. However, a user who uses a medium wishes that the single medium covers a wide range of recording linear velocity so as to dispense him/her from replacing the medium with another type of medium for each of different recording line velocities. In order to satisfy this request, a recording method should be optimized by increasing the peak power applied, as one method so as to achieve recording under such a condition.

However, according to a conventional method, unless control is made precisely for each of various recording line velocities on a top peak power application starting time of pulse series to be applied upon recording a predetermined length of mark on a recording medium, 'asymmetry' which is an item of recording characteristics may not lie within a required range. If so, recorded data thus obtained may not be reproduced properly therefrom, and, thus, data error may occur. Furthermore, along therewith, as a margin with respect to the peak power should be narrowed, and, thus, recording signal quality may tend to decrease further.

An object of the present invention is to provide a recording method for recording with a disk drive designed for CAV recording, and for recording with accessing in a random manner at high speed on a phase change optical recording medium on which recording can be achieved with a disk drive designed for a low recording linear velocity with a low peak laser power, also, recording can be achieved with a drive designed for a high recording linear velocity.

Another object of the present invention is to provide a recording method suitable for CAV recording onto a phase change optical recording medium on which recording at a low linear velocity can be achieved in a low peak power range while recording at a high linear velocity can be achieved in a high peak power range, wherein, in the CAV recording, the linear velocity changes continuously from the low linear velocity through the high linear velocity throughout a range from an inner circumferential part through an outer circumferential part of the medium. A further particular object of the present invention is to provide a recording method advantageous for an optical recording medium which is a rewritable DVD, having the maximum linear velocity of 4 time speed (4×) of DVD, and, also, backward compatible with a disk drive which performs recording at a linear velocity in a range between 1 time speed (1×) and 2.4 time speed (2.4×).

The above-mentioned objects can be achieved by the following first through eighth aspects of the present invention:

According to the first aspect of the present invention, an optical recording method of recording information to a phase change optical recording medium utilizing change in optical constant caused by reversible phase change between a crystalline phase and an amorphous phase by controlling optical power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, includes the step of:

a) starting a top peak power application interval with a delay from a data input pulse signal starting time for a target mark length nTw, where n denotes an integer in a range between 3 and 14, with changing the delay in proportion to the window width Tw with changing a proportionality factor discretely with respect each linear velocity.

According to the second aspect of the present invention, in the optical recording method according to the above-mentioned first aspect of the present invention:

as the recording linear velocity is increased, with respect to those at the minimum linear velocity, the top peak power application starting time and a tail bias power application ending time are changed in proportion to the window width Tw with changing the proportionality factor for each linear velocity discretely.

According to the third aspect of the present invention, an optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, includes the step of:

a) changing, upon increase in the recording linear velocity, a top peak power application starting time and a tail bias power application ending time in proportion to the window width Tw, with controlling any one thereof with an interval proportional to the window width Tw determined by a fixed factor with respect to the window width Tw independent of the linear velocity, with respect to those at the minimum linear velocity.

According to the fourth aspect of the present invention, the optical recording method according to any one of the above-mentioned first through third aspects of the present invention includes the step of:

b) changing the tail bias power application ending time in a range between 0 and the window width Tw upon decrease in the linear velocity in case where recording is made in a range between the maximum linear velocity and the minimum linear velocity.

According to the fifth aspect of the present invention, in the optical recording method according to the above-mentioned fourth aspect of the present invention, the phase change optical recording medium applied is characterized in that, by continuously applying the erase power which corresponds to more than 20% of the maximum peak power used for recording, the reflectance decreases from that of a not-yet-recorded state at the maximum linear velocity, while the reflectance does not decrease at the minimum linear velocity.

According to the sixth aspect of the present invention, in the optical recording method according to any one of the above-mentioned first through fifth aspects of the present invention, the minimum linear velocity is more than 1.0 times of a reference linear velocity, while the maximum linear velocity is four times the reference linear velocity.

According to the seventh aspect of the present invention, in the optical recording method according to any one of the above-mentioned first through sixth aspects of the present invention:

the linear velocity for a case where CAV recording is performed within a data zone to be recorded is determined in a manner in which:

for a case where the linear velocity at the outermost radial position is 4 time speed, the linear velocity at an intermediate radial position is 2.83 time speed, and the linear velocity at the innermost radial position is 1.65 time speed; and for a case where the linear velocity at the outermost radial position is 2.4 time speed, the linear velocity at the intermediate radial position is 1.7 time speed, and the linear velocity at the innermost radial position is 1 time speed.

According to the eighth aspect of the present invention, in the optical recording method according to any one of the above-mentioned first through seventh aspects of the present invention, the linear velocity changes continuously from the innermost radial position through the outermost radial position while the window width is changed along therewith substantially in inverse proportion thereto.

BRIEF DESCRIPTION OF THE DRAWINGS

Other objects and further features of the present invention will become more apparent from the following detailed description when read in conjunction with the following accompanying drawings.

DETAILED DESCRIPTIONS OF THE PREFERRED EMBODIMENTS

According to the above-mentioned first aspect of the present invention, for example, a case is assumed where CAV recording is performed on an optical recording medium with a diameter of 120 mm approximately from the innermost radial position of 24 mm through the outermost radial position of 58 mm in a user data zone thereof. In this case, in each pulse series of pulse application light, an interval for which a peak power is applied is controlled according to a window width (Tw: 38.2 nanoseconds for DVD's 1 time speed for example in case where recording is performed at a uniform linear velocity) determined for each recording linear velocity. Especially, by controlling the peak power application time at the top part of the pulse series according to the window width, it becomes possible to obtain satisfactory recording characteristics throughout a wide linear velocity range. Especially, this method is advantageous for improving 'asymmetry'. Furthermore, it becomes possible to perform CAV recording with a further low peak power for a range of linear velocity from the minimum recording linear velocity through an intermediate linear velocity.

The present invention according to the above-mentioned second and third aspects is methods which are advantageous for obtaining further satisfactory recording characteristics for a range from low linear velocity recording in an inner circumferential recording zone through outer high linear velocity recording in an outer circumferential recording zone.

The present invention according to the above-mentioned fourth and fifth aspects is methods which are superior in backward compatibility.

The present invention according to the above-mentioned sixth aspect of the present invention relates especially to a preferable recording linear velocity range. It is noted that the reference linear velocity of DVD is 3.49 m/s.

A phase change optical recording medium for which the present invention is applicable is one for which recording/playback can be performed with a laser beam in a range between 400 and 780 nm in wavelength. For example, in case of DVD, the wavelength of a laser applied is in a range between 650 and 665 nm, with a numerical aperture of an objective lens applied in a range between 0.60 through 0.65, an application beam diameter of less than 1 μm, and the shortest mark length of 0.4 μm.

According to 1 time speed (1×) of DVD, the linear velocity is approximately 3.5 m/s (3.49 m/s), and the clock frequency is 26.16 MHz (Tw: 38.2 nanoseconds). According to the 4 time speed (4×) of DVD, the linear velocity is approximately 14 m/s (13.96 m/s) and the clock frequency is 104.6 MHz (Tw: 9.56 nanoseconds).

According to the present invention, a case is assumed in which CAV recording is performed onto an optical recording medium which is optimum for a maximum recording linear velocity of 14 m/s in a range approximately from the innermost radial position of 24 mm at recording beginning through the outermost radial position of 58 mm in a diameter of 120 mm. In this case, CAV recording is performed in two types of linear velocity ranges, i.e., a first range from 1.65 time speed through 4 time speed (intermediate linear velocity: 2.83 time speed) and a second range from 1 time speed through 2.4 time speed.

Figure 1:
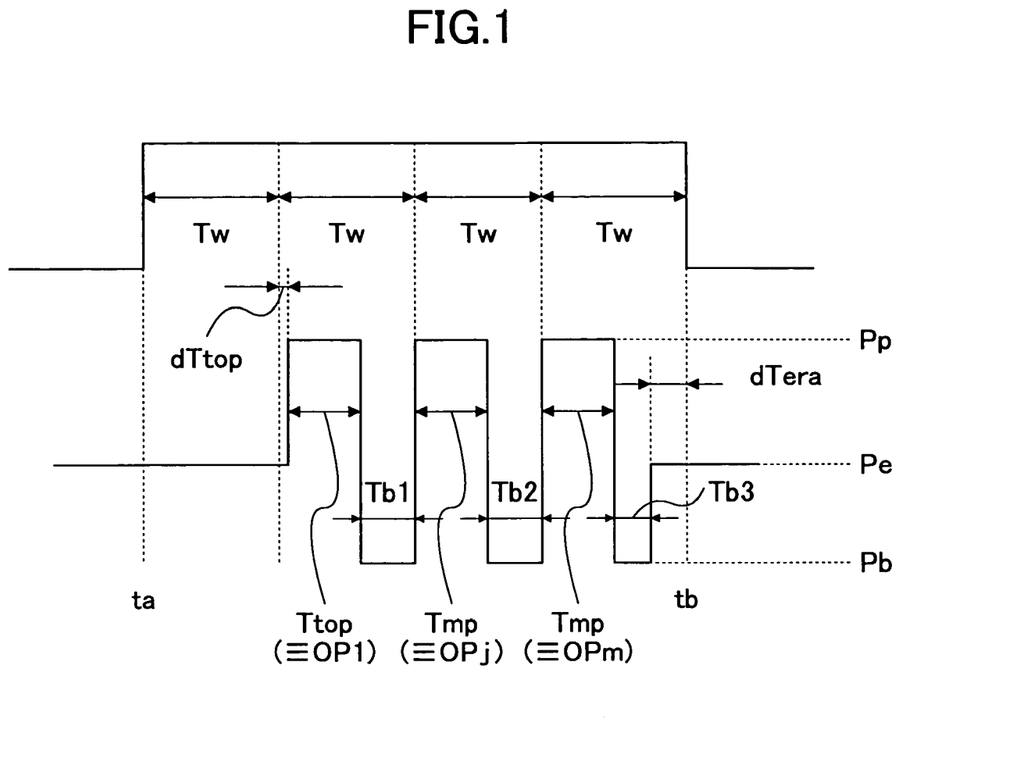
FIG. 1 shows a light emission waveform used for performing recording/erasing onto an optical recording medium.
Figure 7:
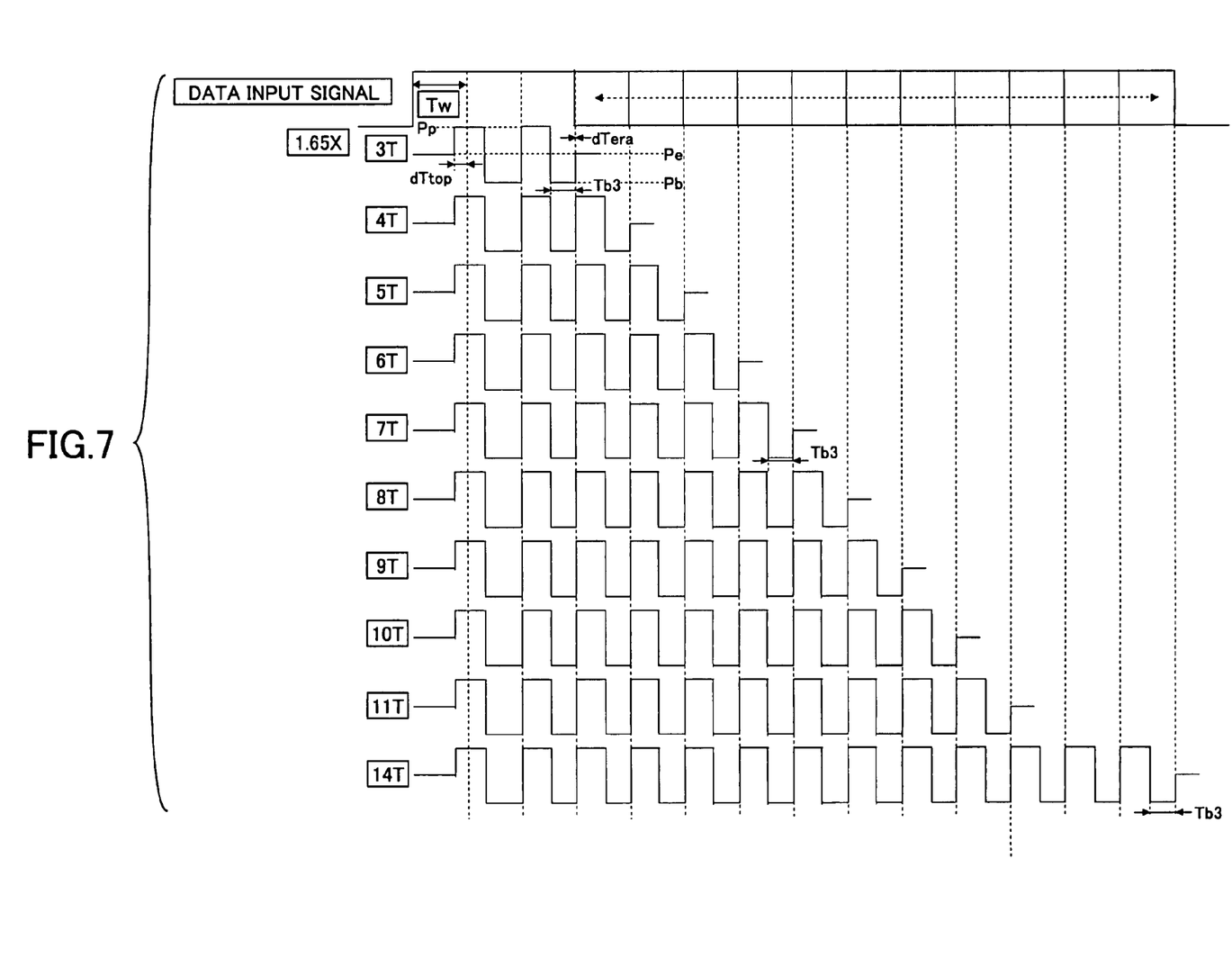
FIGS. 7 through 9 show pulse waveforms applied upon recording at respective recording line velocities of 1.65× (1.65 time speed), 2.83×(2.83 time speed) and 4.0×(4 time speed) for each mark length in a range between 3 T and 14 T according to the embodiment 1.
Figure 8:
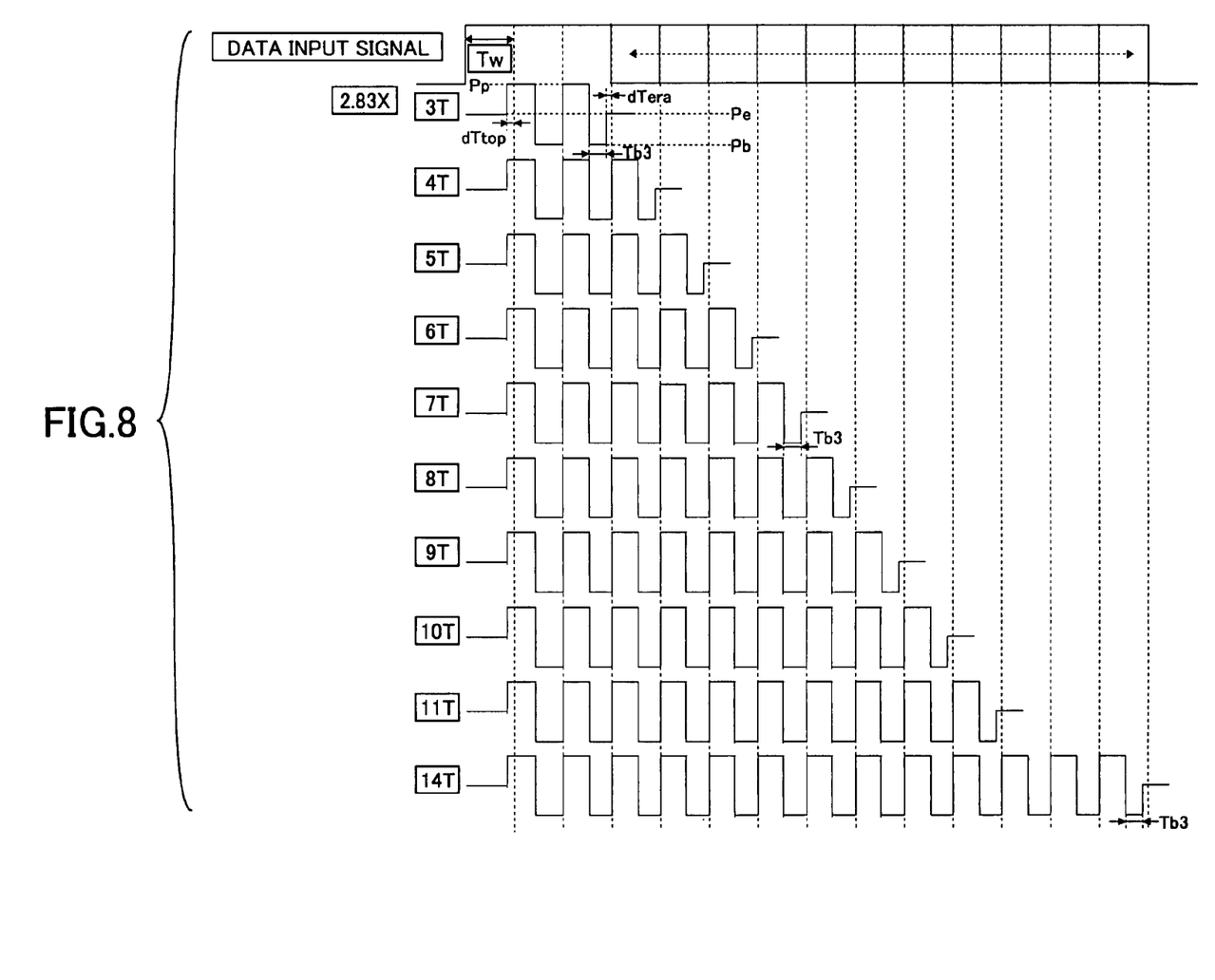
Figure 9:
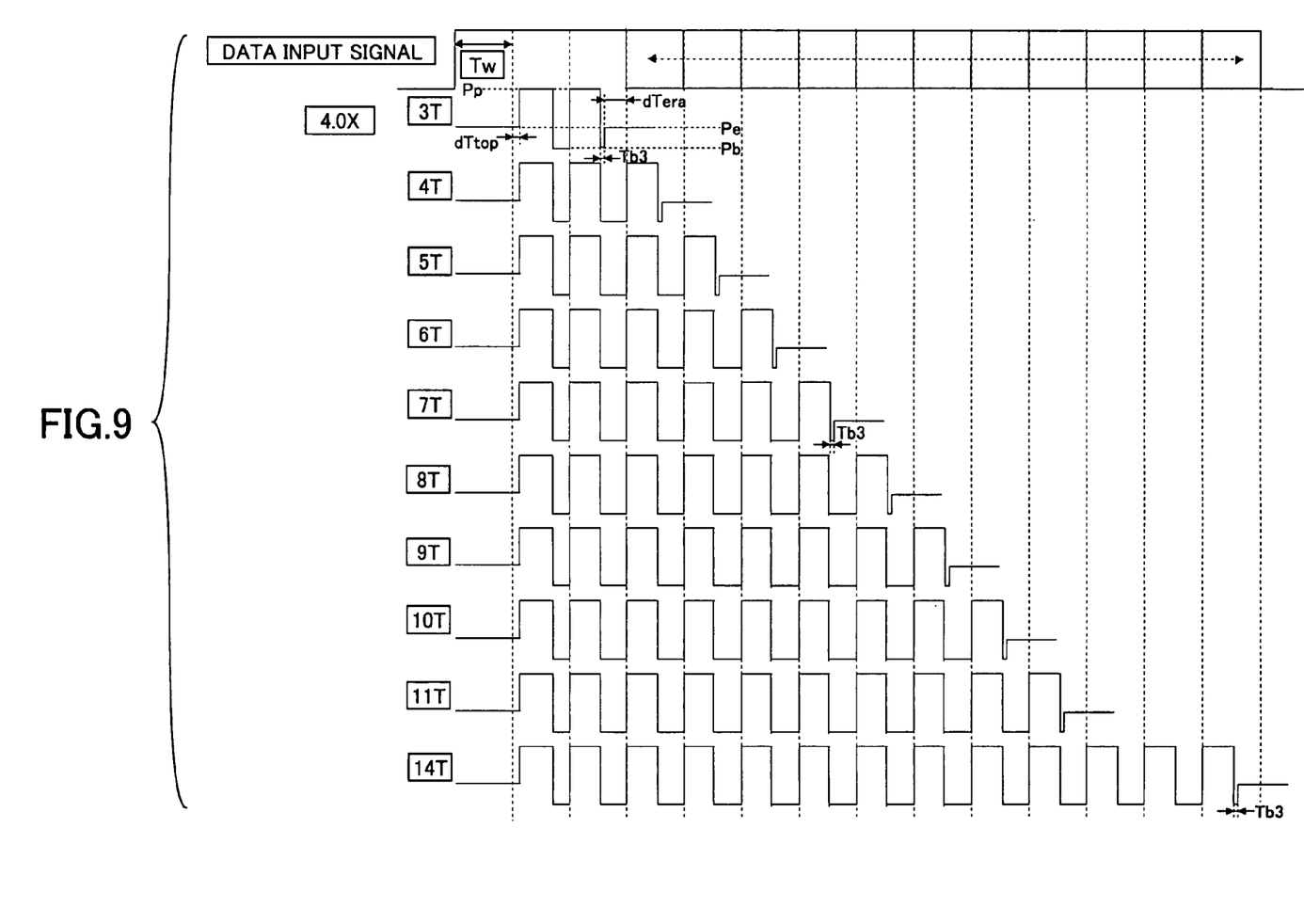

The optical recording medium to which the present invention is applicable has these features, and also, in order to obtain satisfactory performance by means of a recording method, the following light emission waveform is applied:

FIG. 1 shows a light emission waveform applied for recording/erasing according to the present invention. As a light application power, a peak power (Pp), an erase power (Pe), and a bias power (Pb) are used. As shown, a top peak power (heating pulse) application interval Ttop for a top pulse, an intermediate peak power (heating pulse) application interval Tmp for an intermediate pulse and a tail peak power (heating pulse) application interval Tmp for a tail pulse, for each of which a peak power Pp is applied for hearting a recording layer of the optical recording medium, are set. Furthermore, a bias power (cooling pulse) application intervals Tb1, Tb2 and Tb3 for applying the bias power Pb are also set. As shown, for an intermediate window width Tw, the sum of the intermediate peak power application interval Tmp and the bias power application interval Tb2 is equal to the Tw. Actually, the total number of the pulses are (n-1) or (n-2) with respect to a desired mark length nT where n lies within a range between 3 and 14. In case where n is more than 3, the number of intermediate peak power application intervals Tmp increases accordingly together with the respective bias power application intervals Tb2 as shown in FIGS. 7, 8 and 9, for example.

In order to perform CAV recording, the peak power application interval is controlled for each linear velocity with an interval proportional to the window width Tw corresponding to particular linear velocity and a fixed interval. Thus, a control is made in proportion to the window width Tw. Thereby, in comparison to a case where the interval is fixed, it becomes possible to continuously change the actual peak power application interval according to change in the linear velocity. Thereby, recording can be achieved in a condition without changing the pulse interval discontinuously from a certain intermediate linear velocity.

Conventionally, in case of recording in a range between 1 time speed and 2.4 time speed, it is possible to form an optimum mark by, other than employing a control in which the peak power application interval is controlled with a sum of an interval proportional to the window width Tw and a fixed interval, instead employing a control in which the peak power application starting time on the top pulse is fixed without regard to the linear velocity while the bias power application ending time on the last pulse is changed according to the linear velocity.

However, in case of applying a recording medium designed both for 4 time speed recording and for backward compatibility, even when this method can be applied as it is for a range in linear velocity from 1.65 time speed through 4 time speed, a satisfactory performance may not be obtained in CAV recording. This is because, when the peak power application starting time on the top pulse is determined suitable for 4 time speed recording, there is a tendency in which, in a range of a lower linear velocity, a short mark becomes shorter than a predetermined mark length. Thereby, a playback error may be likely to occur for such a short record mark.

In comparison thereto, according to the present invention, the peak power application starting time dTtop shown in FIG. 1 is controlled so that it changes in proportion to the window width Tw and also the proportional part changes continuously with respect to the linear velocity applied. Thereby, satisfactory performance can be obtained throughout a range between the low linear velocity and the high linear velocity. Furthermore, in this case, it is preferable that, a control is made such that, for the low linear velocity range, the peak power application starting time on the top pulse is made earlier than the beginning reference time (ta in FIG. 1), while the same is made later than the beginning reference time ta as the linear velocity range becomes higher, continuously.

Simultaneously, the part proportional to the window width Tw in the tail bias power application interval is changed continuously in the following manner: The tail bias power application ending time is made later than a reference position (tb in FIG. 1) so that the tail bias power application interval Tb3 becomes longer for the lower linear velocity range while the same is made earlier than the reference position (tb) so that the tail bias power application interval Tb3 becomes shorter. Thus, the tail bias power application ending time varies continuously as the linear velocity applied varies. This recording method is optimum for the recording medium which the present invention is applicable. Especially, for the 4 time speed recording which is recording at the highest linear velocity, it is preferable that the tail bias power application interval Tb3 is made to be 0 or to close to 0 unlimitedly, while the same is made to have an interval approximately equal to the window width Tw for a lower linear velocity range, especially, for 1 time speed, as shown in FIGS. 7, 8 and 9. A range of linear velocity which is especially advantageous to be applied in the above-mentioned method is a range between 1.65 time speed (1.65×) and 4 time speed (4×).

The factor of proportionality with respect to the window width Tw is determined from an interval controllable in a recording apparatus applied in case of 4 time speed recording. For example, in case an interval of 0.5 nanoseconds is the minimum controllable interval by the apparatus, $$9.56 (nanoseconds) \times c = 0.5 (nanoseconds), and$$

thus, $$c \approx 1/20 = 0.05.$$

Thus, Tw/20 is the minimum controllable time interval. Accordingly, depending on a particular type of recording medium, a factor 'i' is determined as being 1, 2, 3, ..., and control of the relevant interval (dTtop or dTera) is made by applying the value (i×Tw/20) as the above-mentioned interval proportional to Tw.

On the other hand, same as the above, the above-mentioned fixed interval of the interval (dTtop or dTera) is also determined from an interval controllable in the recording apparatus applied so that the relevant pulse interval can be controlled continuously according to the linear velocity. Assuming that the interval of 0.5 nanoseconds is the minimum controllable interval, a control of the fixed interval is made by applying thereto an internal (0.5×j) where j=1, 2, 3. As a result, the heating pulse interval is expressed by the following formula with the interval proportional to the window width Tw (i×(Tw/20) and the fixed interval (0.5 j):

$$i \times (Tw/20) + 0.5 j.$$

Thereby, as the recording linear velocity varies, Tw determined corresponding to the linear velocity varies accordingly, and thus, CAV recording is achieved.

Furthermore, it is also possible to perform a control such that the top peak power application interval Ttop is made different from the intermediate or tail peak power application interval Tmp. That is, Ttop ≠ Tmp. It is preferable that a time interval of the Ttop or Tmp lies within a range between 0.2×Tw and 0.8 ×Tw.

Assuming that c=1/16, dTtop=i×(Tw/16), and a range later from the reference position ta is expressed by minus (−) while a range earlier from the reference position ta is expressed by plus (+), it is preferable that dTtop is −(3×Tw/16) for 4 time speed; dTtop is (3×Tw/16) for 1.65 time speed; and dTtop is (0×Tw/16) for the intermediate linear velocity of 2.83 time speed, for example. As the proportionality factor varies linearly in this case, CAV recording is achieved therewith.

Similarly, as to the tail bias power ending time dTera mentioned above, assuming that a range earlier from the reference position tb is expressed by plus (+) while a range later from the reference position tb, i.e., a range in which the bias power application interval Tb3 becomes longer, is expressed by minus (−) it is preferable that the dTera for 4 time speed, 2.83 time speed and 1.65 time speed is, in the stated order, +(8 Tw/16), +(2 Tw/16) and +0, respectively.

It is preferable that dTtop lies within a range between −0.5 and 1 Tw, and, more preferably, within a range between −0.25 and 0.5 Tw.

It is preferable that dTera lies within a range between −0.1 and +0.7 Tw, and, more preferably, within a range between −0.5 and +0.6 Tw.

By thus adjusting the light emission pulse intervals, it is possible to obtain satisfactory recording characteristics.

The peak power Pp, erase power Pe and bias power Pb are maximum 22 mW, 12 mW and 1 mW, respectively, on the disk surface. Also in a case of performing CAV recording with a backward recording/playback apparatus having a maximum linear velocity of 8.5 m/s and a maximum peak power of 16 mW, the same method is applied.

Requirements to be satisfied by an optical recording medium which is suitable to the above-mentioned recording method and also on which recording can be achieved for a wide range of linear velocity between the low linear velocity and the high linear velocity are as follows: By continuously applying the erase power which is more than 20% of the maximum peak power for recording, the reflectance of the recording medium drops from that in the not-yet-recorded state at the highest linear velocity, while, the reflectance at least does not drop at the lowest linear velocity from that in the not-yet-recorded state.

In case where the peak power is maximum 22 mW, an optical recording medium which is applicable by the present invention has the reflectance reduced from that of the not-yet-recorded state at the linear velocity not less than a range between 8 and 11 m/s after continuous application of the erase power of 11 mW, which is 50% of the maximum peak power of 22 mW. A preferable linear velocity range in which the reflectance starts dropping is a range between 9.5 and 11 m/s. On the other hand, in case where the recording linear velocity is 14 m/s, the reflectance drops by 30 through 70% from that of the not-yet-recorded state. On the other hand, in case of linear velocity of 3.5 m/s, the reflectance becomes equal to or higher than that of the not-yet-recorded state. Thereby, it becomes possible that, in the optical recording medium which satisfies the above-mentioned requirements, recording can be performed with a low peak power in a low recording linear velocity range, and, also, recording can be performed also in a high linear velocity range.

Figure 2:
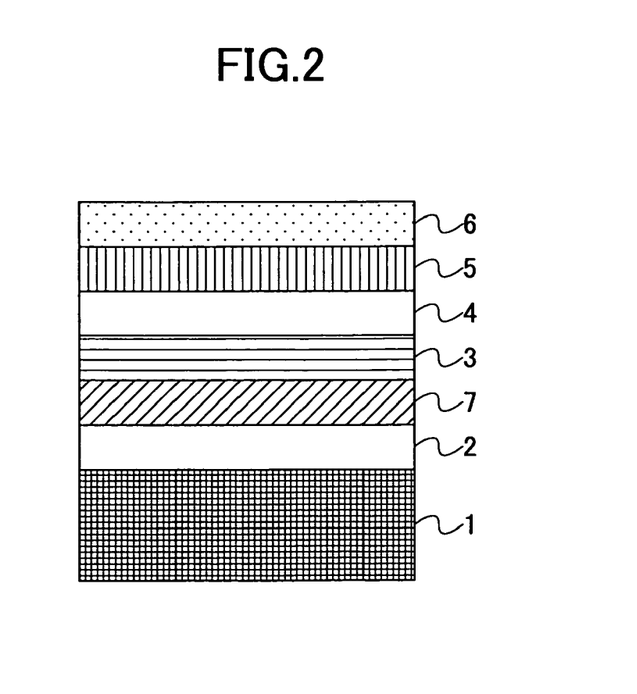
FIG. 2 illustrates an example of a basic configuration of an optical recording medium to which the present invention is applicable.

FIG. 2 shows one example of a basic layer configuration of an optical recording medium to which the present invention is applicable. As shown, on a substrate 1, a lower protective layer 2, an interface layer 7, a phase change recording layer 3 which reversibly changes in phase between a crystalline phase and an amorphous phase, an upper protective layer 4, a sulfating-avoiding layer 5, and a reflective layer 6 are laminated in the stated order. The interface layer is provided if necessary, and it may also be provided between the recording layer and upper protective layer.

As material of the substrate, a plastic such as polycarbonate (PC), polymethylmethacrylate acid (PMMA) or so, or a glass, which is transparent with respect to recording/playback light applied is used.

As material of the upper and lower protective layers, any one of various types of dielectric materials may be used. For example, metal oxide such as SiOx, ZnO, $SnO_2$, $Al_2O_3$, $TiO_2$, $In_2O_3$, MgO, $ZrO_2$, $Ta_2O_5$ and so forth; nitride such as $Si_3N_4$, AlN, TiN, BN, ZrN, and so forth; and sulfide such as ZnS, $TaS_4$ and so forth; and carbide such as SiC, TaC, $B_4C$, WC, TiC, ZrC and so forth, can be cited as candidates for this material.

Each of these materials may be applied alone or some thereof may be applied as a composite. Especially, a composite of ZnS and $SiO_2$ is commonly used in a phase change optical recording medium, and, in this case, the mixture ratio thereof is preferably 80:20 (molar ratio).

As a material of the lower protective layer, a material which has a low thermal conductivity and a low specific heat, which is not likely to be crystallized by overwriting operation, and which does not have crack occurrence, element diffusion or so, even having undergoing a history of many times of heating and rapid cooling, is preferable. $ZnS.SiO_2$ (80:20) satisfies these requirements, and, thus, may be preferably used also as the upper protective layer.

Also, $ZrO_2$ containing $Y_2O_3$ in a range between 3 and 6 molar % has a refractive index equal to or more than that of $ZnS.SiO_2$, and, thus, is also preferable for the same purpose. In case of $ZrO_3$ is applied alone, a record mark is likely to be degraded due to crystallization when being left in a high temperature environment.

A composite of $ZrO_2.Y_2O_3$ (3 molar %) and $TiO_2$ is also preferable. The mixture ratio of 20:80 (molar ratio) is preferable in this case. However, other than this ratio, the mixing amount of $TiO_2$ should be 70 molar % at most. In case of $TiO_2$ alone, stability as an oxide film is not satisfactory, and it is likely to react with a constituent of the recording layer.

As the oxide, $Al_2O_2$ is also preferable.

The interface layer is provided for the purpose of facilitating crystal growth at a record mark end part, increasing the erasure ratio, and thus, improving overwriting performance. It is found out that the film thickness thereof should lie within a range between 1 and 5 nm, so that the material provides a required performance, and also, degradation in preservation reliability can be reduced fairly.

The film thickness of the lower protective layer should lie within a range between 40 and 250 nm, and, preferably within a range between 45 and 80 nm. If the thickness is smaller than 40 nm, environmental resistance function may be degraded, radiation function may be degraded, and repetitive overwriting performance may be degraded. If the thickness is larger than 250 nm, film peeling off, or crack generation may occur due to temperature rise in the film during a film formation process in a spattering method or so.

The film thickness of the upper protective layer should lie within a range between 5 and 50 nm, and preferably, within a range between 8 and 20 nm. If it is larger than 50 nm, repetitive overwriting performance may be degraded due to deformation by temperature rise or degradation in radiation performance.

As the reflective layer, any metal materials such as Al, Ag, Cu, Pd, Cr, Ti or so may be used alone or in a form of an alloy thereof. Especially, Ag or an Ag alloy which has a high thermal conductivity is preferable;

However, in case of employing Ag or an Ag alloy, the sulfating-avoiding layer should be provided between the reflective layer and the upper protective layer for the purpose of avoiding corrosion of Ag by sulfur included in the upper protective layer. As the material of the sulfating-avoiding layer, it is found out from a study until now that Si and SiC are preferable. $ZrO_2$, MgO, TiOx are also suitable for this purpose.

In case of SiC, the effect is still high even if the film thickness is reduced to the order of 3 nm. However, at least 2 nm is needed, and the upper limit is 10 nm. If the film is made thicker than this upper limit, the distance from the reflective layer becomes larger, and, as a result, the radiation efficiency is degraded, and, also, the reflectance becomes degraded due to high absorption.

The thickness of the reflective layer is preferably within a range between 50 and 250 nm. If the film thickness is too large, while the radiation performance is improved, deformation may occur in the substrate due to temperature rise in the medium during film formation process. If the thickness is too small, the radiation performance is degraded, and thus, the recording characteristics are degraded.

As the phase change recording layer, until now, based on eutectic composition around $Sb_{70}Te_{30}$, Ag, In and further Ge are added thereto, and, thus, a AgInSbTe family and a AgInSbTeGe family have been used, since they are materials suitable for high recording linear velocity and also high density recording. As the ratio of Sb with respect to Te increases, the crystallization speed increases. However, as the amount of Sb exceeds 80 atomic %, the crystallization speed increases, while the preservation performance becomes extremely worse, and also, it becomes difficult to form an amorphous phase. Accordingly, the preferable amount of Sb to achieve high linear velocity recording is within a range between 65 and 80 atomic %. On the other hand, the amount of Te should be within a range between 15 and 25 atomic %.

Ge is an essential element for the purpose of improving the preservation performance of a record mark under high temperature environment. It is considered that, the bond energy between Ge and Te is large, also, the crystallization temperature increases as the Ge adding amount increases, and thus, the preservation performance is improved. However, if the Ge is added too much, the crystallization temperature increases further, and thus, the crystallization speed decreases. Accordingly, the Ge adding amount should preferably be not more than 5 atomic %.

Ag stabilizes a record mark, and does not have a function to increase the crystallization temperature much. However, if Ag is added too much, the crystallization speed is lowered, and, thus, it is not preferable to add Ag too much. Accordingly, the adding amount of Ag is preferably not more than 3 atomic %.

In increases the crystallization speed and also increases the crystallization temperature. Accordingly, the preservation performance is increased therewith. However, if it is added much, demixing is likely to occur, and thus repetitive overwriting performance may be degraded and also degradation against playback light power may occur. Accordingly the adding amount thereof should be not more than 5 atomic %.

Other than In, Ga or Mn also increases the crystallization speed. Ga has a performance of increasing the crystallization speed more than that of In in the same amount. However, the crystallization temperature is also increased. Accordingly, it is preferable to add Ga in a range not more than 5 atomic %. On the other hand, as to Mn, it is sufficient to add 5 atomic % at most. By further adding Ga, it is possible to improve the crystallization speed and preservation performance effectively.

The thickness of the phase change recording layer is preferably in a range between 10 and 20 nm. If it is thinner than 10 nm, a difference in reflectance between crystalline phase and amorphous phase is reduced, while, if it is thicker than 20 nm, the recording sensitivity and the repetitive overwriting performance become worse.

Consequently, a preferable thickness of each layer of the phase change optical recording medium which the present invention is applicable is as follows:

the interface layer: in a range between 2 and 4 nm;

the phase change recording medium: in a range between 11 and 13 nm;

the upper protective layer: in a range between 10 and 15 nm;

the sulfating-avoiding layer: in a range between 3 and 5 nm; and the Ag reflective layer: in a range between 120 and 160 nm.

In this case, the film thickness of the lower protective layer is preferably within a range between 40 and 80 nm, especially the reflectance becomes lowest around 50 nm thereof, and the performance becomes satisfactory especially within a range between ±5 nm of this film thickness.

The substrate is made such that the pitch between adjacent grooves in which record marks are written is 0.74 μm; the groove depth is in a range between 15 and 45 nm; and the groove width is in a range between 0.2 and 0.3 μm. The groove is a wobbling groove having the cycle of approximately 820 kHz. In an address part, a phase in the frequency of the wobbling groove is modulated, the change in the phase is detected, the detected signal is converted into a binary signal, and thus, a particular address is read therefrom. The amplitude of the wobbling part is in a range between 5, and 20 nm. A recording line density is 0.267 μm/bit, and recording is performed according to an (8–16) modulation method.

Specific embodiments of the present invention will now be described in detail. However, the present invention is not limited to these embodiments.

Embodiment 1

First, a phase change optical recording medium was produced as follows:

By using a substrate made of polycarbonate with a thickness of 0.6 mm, having a groove pitch of 0.74 μm, a groove width of 0.25 μm and a groove depth of 25 nm for recording record marks therein, each layer was laminated thereon by a spattering method.

First, a target of $ZnS:SiO_2=80:20$ (molar %) was used, and a lower protective layer with a film thickness of 54 nm was provided.

Then, a target of a composition of Ge:Ag:In:Sb:Te=3.8:0.3:3.5:72:20.4 was used, and a phase change recording layer with a film thickness of 12 nm was provided.

Then, a target of composite oxide of $ZrO_2.Y_2O_3$ (3 molar %).$TiO_2$ (20 molar %) was used, and an interface layer with a film thickness of 3 nm was provided.

Then, a target of $ZnS:SiO_2=80:20$ (molar %) was used, and an upper protective layer with a film thickness of 11 nm was provided.

Then, after an SiC layer (sulfating-avoiding layer) with a film thickness of 4 nm and an Ag reflective layer with a film thickness of 140 nm were provided, SD318 ultraviolet curing resin made of Dainippon Ink Co. Ltd. was coated thereon with a thickness of 5 μm for the purpose of improving environment-resistance property, then curing thereof was achieved, and, thus, an environment-resistance protective film was formed.

Finally, the thus-produced substrate with the respective layers thus provided thereon as mentioned above and another substrate same as the above-mentioned substrate but having no layers formed thereon were made to adhere together with a use of ultraviolet curing resin (made of acryl, by Nippon Kayaku Co., Ltd., DVD003) with a thickness of 40 μm, and, thus, the phase change optical recording medium was obtained.

After that, by using a large diameter LD (with a beam diameter of 1 μm along track direction×75 μm along radial direction) with a wavelength of 810 nm, the recording layer was crystallized (initialized) at a linear velocity of 10 m/s, with power of 1300 mW, at a head feeding speed of 36 μm/rotation.

Then, when DC light of 11 mW was applied to this optical recording medium with the above-mentioned recording head while the linear velocity was changed, the reflectance started dropping from around the linear velocity of 10 m/s. In other words, after the DC light application was performed upon changing the linear velocity, the reflectance thereof was measured for each position at which the DC light application was thus made at a different linear velocity. Thereby, it was found out from the measurement result that the reflectance started dropping from around the linear velocity of 10 m/s as mentioned above. By this measurement, the crystallization speed of the recording medium was measured.

Recording/playback was performed with a pickup head with a wavelength of 662 nm and an objective lens of NA: 0.65 so that the recording density of 0.267 μm/bit was obtained at the maximum linear velocity of 14 m/s. The recording was performed in a condition where the peak power was maximum 21 mW, the bias power was 5 mW, and the erase power lay within a range between 30% and 55% of the peak power. The number of pulses for each mark length was n-1 where n lay within a range between 3 and 14. The optimum power for each recording linear velocity was set as being 18.5 mW, 18.5 mW and 19.5 mW for 1.65 time speed (1.65×), 2.83 time speed (2.83×) and 4.0 time speed (4.0×), respectively.

The following Table 1 shows recording conditions under which CAV recording was performed within a range of linear velocity between 14 m/s (4 time speed) and 5.8 m/s (1.65 time speed). Parameters shown in Table 1 are basically same as the symbols shown in FIG. 1. In addition, it is noted that Ttop≡OP1, Tmp≡(OPj, OPm) and ϵ=Pe/Pp.

TABLE 1

| recording linear velocity (time speed) | recording linear velocity (m/s) | Parameter | | | | |
|---|---|---|---|---|---|---|
| | | dTtop | Ttop | Tmp | dTera | ϵ |
| 1.65 | 5.8 | 3 × Tw/16 | 7 × Tw/ | 5 × Tw/ | 0 | 0.53 |
| 2.83 | 9.9 | 1 × Tw/16 | Tw/ | Tw/ | 2 × Tw/16 | 0.50 |
| 4.00 | 14.0 | −2 × Tw/16 | 16 + 1.2 ns | 16 + 1.8 ns | 8 × Tw/16 | 0.31 |

By determining the pulse intervals as shown in Table 1, and controlling the pulse beginning times and ending times with the values of dTtop and dTera, satisfactory performance could be obtained. Especially, by adjusting the beginning time of the top pulse (peak power starting time at the pulse top), and also, changing this value linearly within a range between the minimum linear velocity at the inner circumferential part and the maximum linear velocity at the outer circumferential part of a recording data zone of the optical recording medium, the performance in CAV recording was improved in comparison to a conventional case where the above-mentioned value was fixed.

Figure 3:
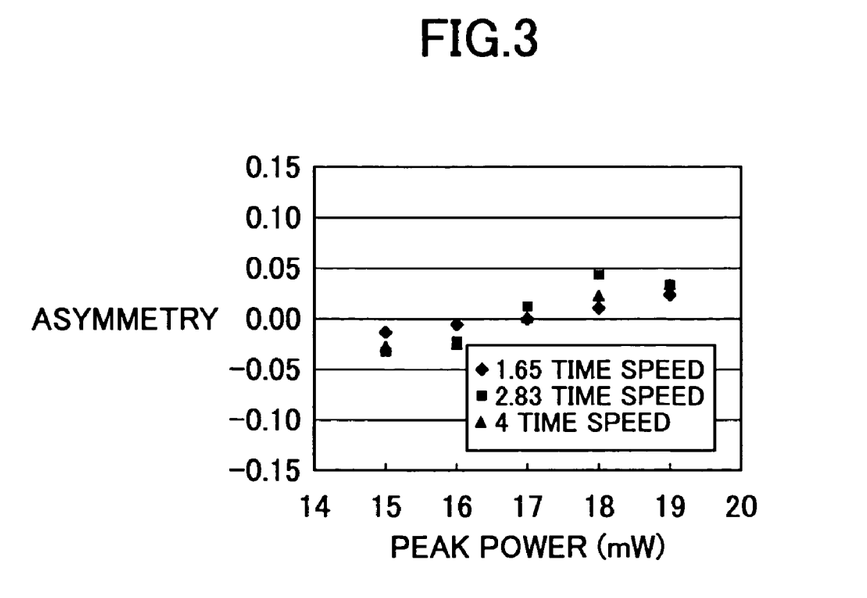
FIG. 3 shows a relation between the peak power and asymmetry in an embodiment 1 according to the present invention.

Further especially, the following advantages of the present invention were proved: It is preferable that a reflectance which is a half of a difference between a reflectance on a shortest mark (amorphous phase) and a reflectance on a position (crystalline phase) between the adjacent marks is made equal to a reflectance which is a half of a difference between a reflectance on a longest mark (amorphous phase) and a reflectance on a position between the adjacent marks, which value affects a playback signal, and is used for evaluation as an item called 'asymmetry' of reproduced signal characteristics. Even when other characteristics are satisfactory, the value of asymmetry has a large influence on the reproduced signal error. The above-mentioned control of dTtop according to the present invention is advantageous for controlling this value of asymmetry to effectively make it to lie within a range between 0 and 5% at any linear velocity. In the embodiment 1 described above, as shown in FIG. 3, the asymmetry falls approximately at zero regardless of the linear velocity. Furthermore, for each linear velocity, the jitter falls within 9% up to a thousand times of overwriting.

FIGS. 7 through 9 show pulse waveforms applied when recording is made at respective recording line velocities of 1.65×(1.65 time speed), 2.83×(2.83 time speed) and 4.0×(4 time speed) for each mark length in a range between 3 T and 14 T according to the embodiment 1 described above.

COMPARATIVE EXAMPLE 1

For the purpose of comparison with the above-mentioned embodiment 1, dTtop was fixed at a value determined for 4 time speed recording, and recording was performed at 2.83 time speed and 1.65 time speed with the fixed dTtop in a comparative example 1. The results are shown in FIG. 4.

Figure 4:
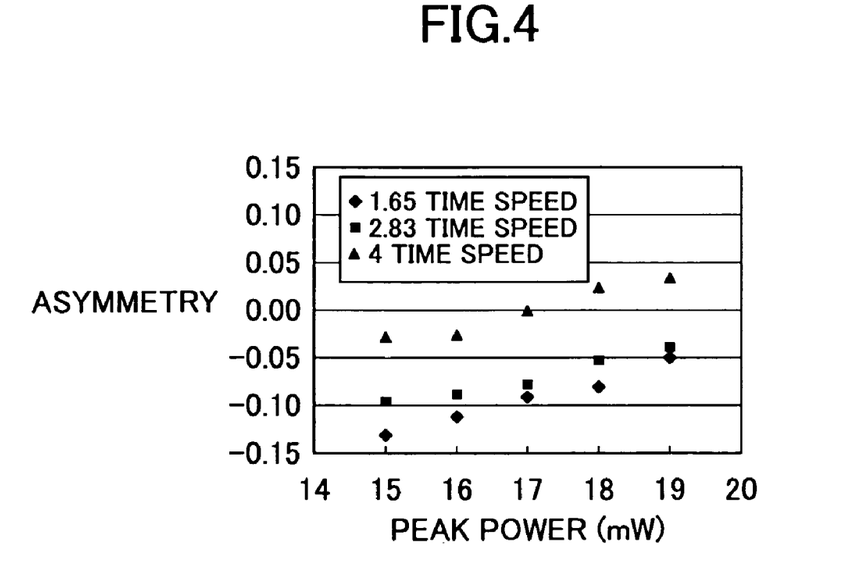
FIG. 4 shows a relation between the peak power and asymmetry in a comparative example 1.
Figure 10:
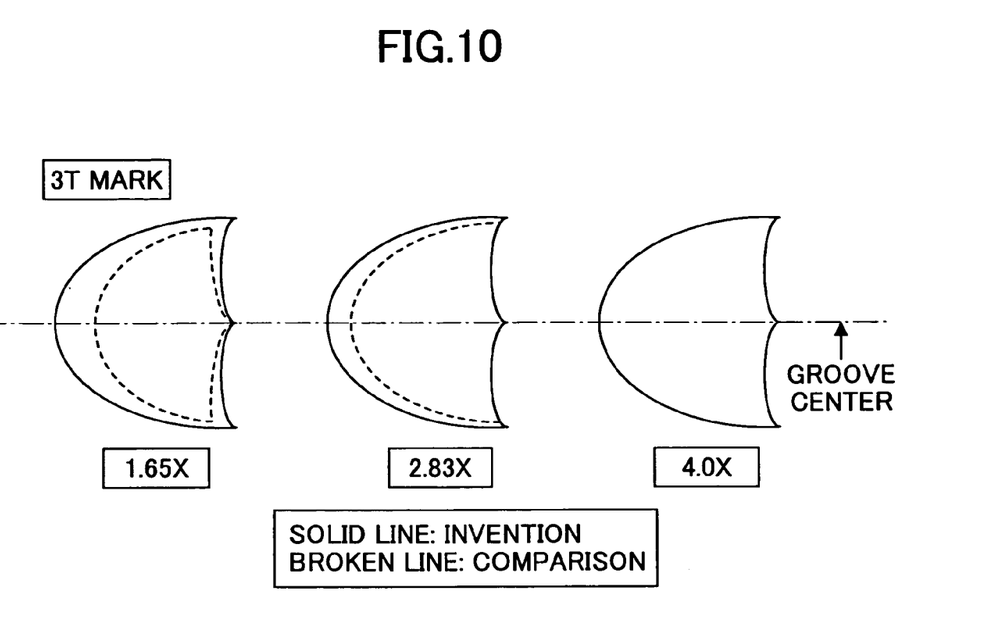
FIG. 10 shows comparison in mark shape between the embodiment 1 and comparative example 1.

As shown in FIG. 4, as the recording speed was changed without changing dTtop, the asymmetry became smaller than −5% (−0.05) in a low linear velocity range. As a result, the data error rate is likely to increase upon playback in this range. FIG. 10 show 3 T marks obtained from the above-mentioned embodiment 1 and the comparative example 1 for the purpose of comparison. As can be seen therefrom, especially in case of fixing the top starting time at a value for the conditions of 4× as mentioned above in the comparison example 1, the mark length is shortened in a low linear velocity range, the total length of the mark is thus shortened, and thus, the jitter and asymmetry become worse. Further, on the contrary, when the interval (controlled with dTera) for which the bias power is applied at the tail part is fixed at a value for the conditions of 1.65×, the mark tail part in case of 4×recording is much elongated, and, thus, the mark is elongated backward especially at the centre of the groove.

Embodiment 2

By using the optical recording medium same as that in the above-mentioned embodiment 1, recording/playback was performed under the conditions shown in Table 2 below. The other conditions were same as those in the embodiment 1. The maximum linear velocity was 2.40 time speed (8.4 m/s), the minimum linear velocity was 1.0 time speed (3.5 m/s) and the intermediate linear velocity was 1.7 time speed (6 m/s).

TABLE 2

| recording linear velocity (time speed) | recording linear velocity (m/s) | Parameter | | | | |
|---|---|---|---|---|---|---|
| | | dTtop | Ttop | Tmp | dTera | ϵ |
| 1.0 | 3.5 | Tw/6 | Tw/6 + 6 ns | Tw/6 + 6 ns | −Tw/6 | 0.47 |
| 1.7 | 6 | Tw/6 | | | 0 | 0.50 |
| 2.40 | 8.4 | Tw/6 | | | Tw/6 | 0.53 |

Figure 5:
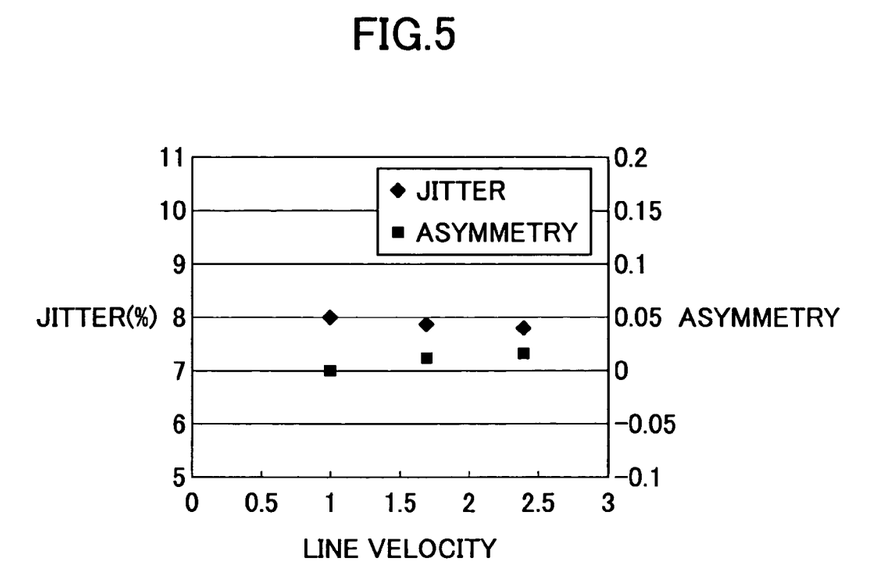
FIG. 5 shows a relation between the linear velocity and jitter/asymmetry in an embodiment 2 according to the present invention.

FIG. 5 shows a result of evaluation of jitter and asymmetry in the recording characteristics thus obtained with the peak power of 15 mW. As shown, satisfactory characteristics were obtained approximately without depending on the linear velocity. In the above-mentioned linear velocity range, the top pulse beginning time (peak power application starting time of the pulse top: dTtop) was determined by a fixed factor (⅙) with respect to the window width Tw without regard to the linear velocity. The jitter shown in FIG. 5 is a result obtained at a tenth of direct overwriting (DOW).

Embodiments 3 Through 5

In an embodiment 4 of the present invention, by using the same optical recording medium as that in the above-mentioned embodiment 1, when the linear velocity was changed from 3.5 m/s through maximum 14 m/s at a rate of 0.5 m/s, the linear velocity at which the reflectance started dropping was around 10.5 m/s (see the embodiment 4 in Table 3 below).

Then, optical recording media were produced in the same way as that in the embodiment 1 except that the material of the recording layer was changed to compositions of Ag:In:Sb:Te:Ge=0.5:5:68:24.5:2 (embodiment 3 of the present invention) and Ag:In:Sb:Te:Ge=0.3:4:73:19.7:3 (embodiment 5 of the present invention), respectively. Then, when measurement was performed as in the embodiment 4 described above, the reflectance started dropping around 8.5 m/s and 11.5 m/s for the embodiments 3 and 5, respectively, as shown in Table 3.

TABLE 3

|  | reflectance dropping start linear velocity | DOW 1 jitter (%) | |
| --- | --- | --- | --- |
|  |  | 4 time speed | 2.4 time speed |
| embodiment 3 | 8.5 m/s | 10.2 | 7.5 |
| embodiment 4 | 10.5 m/s | 8.3 | 7.9 |
| embodiment 5 | 11.5 m/s | 9.4 | 8.5 |

For each recording medium, recording was performed with the peak power of 15 mW at 2.4 time speed and 19 mW at 4 time speed. After that, DOW once jitter (the jitter obtained after once of direct overwriting) was measured. As a result, less than 9% was obtained for each linear velocity only in the embodiment 4 as shown in Table 3.

The peak power of an evaluation apparatus used for these embodiments is maximum 21 mW, and the erase power which is approximately 50% of the peak power was used. Thus, it was found out that, especially, in a configuration by which both the characteristics obtained at 2.4 time speed with less than 15 mW and those obtained at 4 time speed were satisfactory, the linear velocity at which the reflectance starts dropping was around a range between 10 and 11 m/s.

Embodiment 6

Figure 6:
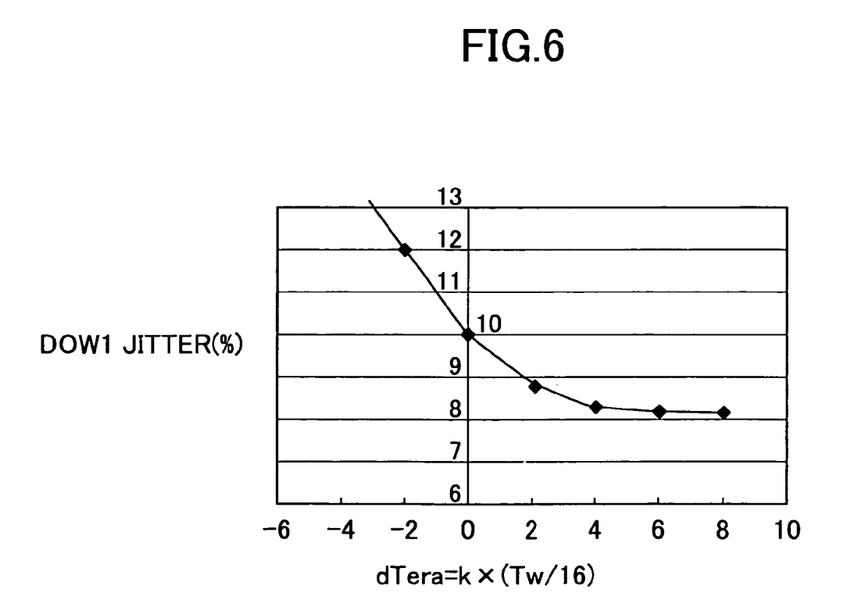
FIG. 6 shows a dependency of a DOW-once jitter from a tail bias power application ending time (dTera) in an embodiment 6 according to the present invention.

With a use of the optical recording medium same as that in the above-mentioned embodiment 1, and recording/playback was performed under 4 time speed recording conditions same as those shown in Table 1 except that dTera was changed therefrom. FIG. 6 shows a dependency from the bias power application ending time at the tail part (dTera) of the DOW once jitter dTera is expressed as a plus (+) value in a range in which the tail bias power application ending time is earlier than the reference point tb shown in FIG. 1 while expressed as a minus (−) value in a range in which the tail bias power application ending time is later than the reference point tb shown in FIG. 1. The horizontal axis of FIG. 6 shows dTera=k×(Tw/16), and the graduations on the horizontal axis denote the values of 'k'.

As can be seen from FIG. 6, as the bias power application ending time approximates the value of 8 Tw/16 (k=8), in other words, as the bias power application interval Tb3 approximates zero, satisfactory characteristics of jitter of less than 9% are obtained.

Embodiment 7

Other than the material of the recording layer, the conditions of the configuration, materials and film thickness were same as those in the embodiment 1, and an optical recording medium was produced in the same method as that in the embodiment 1. The recording material had the composition ratio of Ge:In:Sb:Te=3.5:3.5:72.5:20.5.

After that, by using a large diameter LD (with a beam diameter of 1 μm along track direction×75 μm along radial direction) with a wavelength of 810 nm, the recording layer was crystallized (initialized) at a linear velocity of 10 m/s, with power of 1300 mW, and head feeding speed of 36 μm/rotation. Then, upon applying DC light of 11 mW to the recording medium while changing the linear velocity, the reflectance started dropping around the linear velocity of 10.5 m/s. Recording was performed with recording power under the same conditions as those shown in Table 1 of the embodiment 1. As a result, the same recording characteristics as those in the embodiment 1 were obtained.

By adjusting the reflectance dropping start linear velocity (the linear velocity at which the reflectance starts dropping) toward around a range between 10 and 10.5 m/s, in other words, by optimizing the crystallization speed toward a certain limited range, according to the method described above, 4 time speed recording was properly performed in a CAV manner, and, also, satisfactory recording characteristics were obtained even when recording was performed with low power at a recording speed in a range between 1 and 2.4 time speed.

The upper limit of the recording power described in a document entitled by DVD+RW ver. 1.1 is 15 mW, and, also according to the present invention, satisfactory characteristics were obtained with power less than 15 mW in a range between 1 and 2.4 time speed. Accordingly, it can be said that backward drive compatibility is provided. It is preferable to set the crystallization speed of the recording medium, i.e., a speed in erasing a record mark (crystallization), by setting the reflectance dropping start linear velocity of the recording medium into around 3 time speed (10.5 m/s) which is higher than the intermediate linear velocity (2.5×) of the recording linear velocity range between 1 and 4 time speed, at which the embodiment of the present invention provided the especially high advantage as mentioned above for the embodiment 4. Thereby, it is possible to perform recording even for a range between 1 and 4 time speed in conditions (recording power and laser light emission waveform)

completely same as those in which recording is made in a range between 1 and 2.4 time speed according to the conventional way (DVD+RW book, ver. 1.1).

On the other hand, in order to perform recording at 4 time speed (DVD+RW book, ver. 1.2), a design is made for decelerating the crystallization speed, degradation in the factors of jitter, asymmetry, reflectance drop, and modulation drop thereby become remarkable, and thus, the recording characteristics becomes much worse as the number of times of overwriting increases, according to the conventional method. In contrast thereto, by using the recording medium configuration applicable in the present invention described above, and also, by controlling the light emission waveform in recording, in particular, by controlling the peak power application starting time and application interval at the top part, and the bias power application interval at the tail part according to the present invention described above, it becomes possible to achieve not only CLV recording at 4 time speed but also CAV recording in a range between 1.65 time speed and 4 time speed. To control the pulse at the top part and tail part means to control the length at the top part and tail part of a record mark, and, by such a control according to the present invention, these parts are accurately controlled in the required conditions.

Thus, by applying the present invention, it is possible to provide backward compatibility, and, also, it is possible to remarkably reduce the asymmetry and jitter as well as to remarkably reduce the reflectance drop and modulation drop at a time of overwriting, in recording characteristics obtained from 4 time speed recording. Furthermore, according to the present invention, upon CAV recording, only controlling the temporal factors of the top pulse is necessary, and, thus, for example, it is not necessary to set the top peak pulse power higher than the subsequent peak pulse power, or to set the top peak pulse power lower than the subsequent peak pulse power, or so. As a result, it is not necessary to complicate a laser driving circuit. Simultaneously, it becomes not necessary to perform complicated control such as to change the peak pulse power and/or pulse application interval of the top pulse depending from a factor such as a separation from the antecedent mark, and also, depending from a factor of each mark length.

Further, the present invention is not limited to the above-described embodiments, and variations and modifications may be made without departing from the basic concept of the present invention.

The present application is based on Japanese priority application No.2002-367002, filed on Dec. 18, 2002, the entire contents of which are hereby incorporated by reference.

What is claimed is:

1. An optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, comprising the step of:
   a) starting a top peak power application interval with a delay from a data input pulse signal starting time for a target mark length nTw, where n denotes an integer in a range between 3 and 14, with changing the delay in proportion to the window width Tw with changing the proportionality factor discretely for each linear velocity.

2. The optical recording method as claimed in claim 1, wherein:
   as the recording linear velocity is increased, with respect to those at the minimum linear velocity, a top peak power application starting time and a tail bias power application ending time are changed in proportion to the window width Tw with changing the proportionality factor with respect to each linear velocity discretely.

3. An optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part though an outer circumferential part of the recording medium with an interval proportional to a window width Tw and a fixed interval, wherein for an intermediate window width the sum of the intermediate peak power application interval and the bias power application interval is equal to the intermediate window width, comprising the step of:
   a) changing a top peak power application starting time and a tail bias power application ending time in proportion to the window width Tw, with controlling any one thereof with an interval proportional to the window width Tw determined by a fixed factor with respect to the window width Tw independent of the linear velocity, with respect to those at the minimum linear velocity, upon increase in the recording linear velocity.

4. The optical recording method as claimed in claim 1, comprising the step of:
   b) changing the tail bias power application ending time in a range between 0 and the window width Tw upon decrease in the linear velocity in case where recording is mad in a range between the maximum linear velocity and the minimum linear velocity.

5. The optical recording method as claimed in claim 2, comprising the step of:
   b) changing the tail bias power application ending time in a range between 0 and the window width Tw upon decrease in the linear velocity in case where recording is made in a range between the maximum linear velocity and the minimum linear velocity.

6. The optical recording method as claimed in claim 3, comprising the step of:
   b) changing the tail bias power application ending time in a range between 0 and the window width Tw upon decrease in the linear velocity in case where recording is made in a range between the maximum linear velocity and the minimum linear velocity.

7. The optical recording method as claimed in claim 4, wherein:
   the phase change optical recording medium applied is characterized in that, by continuously applying the erase power which corresponds to more than 20% of the maximum peak power used for recording, the reflectance decreases form that in a not-yet-recorded state at the maximum linear velocity, while the reflectance does not decreases at the minimum linear velocity.

8. The optical recording method as claimed in claim 5, wherein:
   the phase change optical recording medium applied is characterized in that, by continuously applying the erase power which corresponds to more than 20% of the maximum peak power used for recording, the reflectance decreases from that in a not-yet-recorded state at the maximum linear velocity, while the reflectance does not decreases at the minimum linear velocity.

9. An optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, comprising the steps of:
  a) changing a top peak power application starting time and a tail bias power application ending time in proportion to the window width Tw, with controlling any one thereof with an interval proportional to the window width Tw determined by a fixed factor with respect to the window width Tw independent of the linear velocity, with respect to those at the minimum linear velocity, upon increase in the recording linear velocity; and
  b) changing the tail bias power application ending time in a range between 0 and the window width Tw upon decrease in the linear velocity in case where recording is made in a range between the maximum linear velocity and the minimum linear velocity, wherein
  the phase change optical recording medium applied is characterized in that, by continuously applying the erase power which corresponds to more than 20% of the maximum peak power used for recording, the reflectance decreases from that in a no-yet-recorded state a the maximum linear velocity, while the reflectance does not decreases at the minimum linear velocity.

10. The optical recording method as claimed in claim 1, wherein:
  the minimum linear velocity is not less than 1.0 times of a reference linear velocity, while the maximum linear velocity is four times of the reference linear velocity.

11. The optical recording method as claimed in claim 2, wherein:
  the minimum linear velocity is not less than 1.0 times of a reference linear velocity, while the maximum linear velocity is four times of the reference linear velocity.

12. An optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, comprising the steps of:
  a) changing a top peak power application starting time and a tail bias power application ending time in proportion to the window width Tw, with controlling any one thereof with an interval proportional to the window width Tw determined by a fixed factor with respect to the window width Tw independent of the linear velocity, with respect to those at the minimum linear velocity, upon increase in the recording linear velocity; wherein
  the minimum linear velocity is not less than 1.0 times of a reference linear velocity, while the maximum linear velocity is four times of the reference linear velocity.

13. The optical recording method as claimed in claim 1, wherein:
  the linear velocity for a case where CAV recording is performed within a data zone to be recorded is determined in a manner in which:
  for a case where the linear velocity at the outermost radial position is 4 time speed, the linear velocity at an intermediate radial position is 2.83 time speed, and the linear velocity at the innermost radial position is 1.65 time speed; and
  for case where-the linear velocity at the outermost radial position is 2.4 time speed, the linear velocity at the intermediate radial position is 1.7 time speed, and the linear velocity at the innermost radial position is 1 time speed.

14. The optical recording method as claimed in claim 2, wherein:
  the linear velocity for a case where CAV recording is performed within a data zone to be recorded is determined in an manner in which:
  for a case where the linear velocity at the outermost radial position is 4 time speed, the linear velocity at an intermediate radial position is 2.83 time speed, and the linear velocity at the innermost radial position is 1.65 time speed; and
  for case where the linear velocity at the outermost radial position is 2.4 time speed, the linear velocity at the intermediate radial position is 1.7 time speed, and the linear velocity at the innermost radial position is 1 time speed.

15. An optical recording method of recording information to a phase change optical recording medium utilizing change in optical constant caused by reversible phase change between a crystalline phase and an amorphous phase by controlling power to be applied to the recording medium with three values of peak power, erase power and bias power in a recordable range between a minimum linear velocity and a maximum linear velocity, with alternate application of the peak power and bias power in a pulse manner and with changing the pulse application interval continuously from an inner circumferential part through an outer circumferential part of the recording medium with an interval proportional to a window width Tw and a fixed interval, comprising the steps of:
  a) changing a top peak power application starting time and a tail bias power application ending time in proportion to the window width Tw, with controlling any one thereof with an interval proportional to the window width Tw determined by a fixed factor with respect to the window width Tw independent of the linear velocity, with respect to those at the minimum linear velocity, upon increase in the recording linear velocity: wherein
  the linear velocity for a case where CAV recording is performed within a data zone to be recorded is determined in a manner in which:
  for a case where the linear velocity at the outermost radial position is 4 time speed, the linear velocity at an intermediate radial position is 2.83 time speed, and the linear velocity at the innermost radial position is 1.65 time speed; and
  for case where the linear velocity at the outmost radial position is 2.4 time speed, the linear velocity at the intermediate radial position is 1.7 time speed, and the linear velocity at the innermost radial position is 1 time speed.

16. The optical recording method as claimed in claim 13, wherein:
  the linear velocity changes continuously from the innermost radial position through the outermost radial position while the window width is changed along therewith substantially in inverse proportion thereto.

17. The optical recording method as claimed in claim 14, wherein:

the linear velocity changes continuously from the innermost radial position through the outermost radial position while the window width is changed along therewith substantially in inverse proportion thereto.

18. The optical recording method as claimed in claim 15, wherein:

the linear velocity changes continuously from the innermost radial position through the outermost radial position while the window width is changed along therewith substantially in inverse proportion thereto.

* * * * *